United States Patent [19]
Fochtman

[11] Patent Number: 6,079,609
[45] Date of Patent: Jun. 27, 2000

[54] METHOD OF JOINING A MEMBER OF SOFT MAGNETIC MATERIAL TO A MEMBER OF HARDENED MATERIAL USING A FRICTION WELD

[75] Inventor: James P. Fochtman, Williamsburg, Va.

[73] Assignee: Siemens Automotive Corporation, Auburn Hills, Mich.

[21] Appl. No.: 09/181,193

[22] Filed: Oct. 28, 1998

Related U.S. Application Data

[60] Provisional application No. 60/067,984, Dec. 9, 1997.

[51] Int. Cl.[7] .................... B23K 20/12; B23K 20/227
[52] U.S. Cl. ................ 228/113; 228/114; 228/114.5
[58] Field of Search ............................ 228/114, 113, 228/112.1, 114.5, 2.1, 2.3; 378/144; 310/217; 335/68, 296

[56] References Cited

U.S. PATENT DOCUMENTS

| | | | |
|---|---|---|---|
| 3,973,715 | 8/1976 | Rust | 228/112 |
| 4,073,474 | 2/1978 | Hashimoto et al. | 251/368 |
| 4,087,038 | 5/1978 | Yagi | 228/112 |
| 4,256,253 | 3/1981 | Nishiwaki | 228/112 |
| 4,659,005 | 4/1987 | Spindler | 228/112 |
| 5,625,240 | 4/1997 | Bernus | 310/90.5 |
| 5,772,103 | 6/1998 | Hofius, Sr. et al. | 228/114.5 |
| 5,930,332 | 7/1999 | Eggleston et al. | 228/113 |

*Primary Examiner*—Patrick Ryan
*Assistant Examiner*—Jonathan Johnson

[57] ABSTRACT

A method of joining a magnetic armature of an electromagnetic actuator to a shaft is provided. The method includes holding the armature stationary while spinning the shaft. The spinning shaft is then pressing against the stationary armature such that friction between the shaft and the armature causes a portion of the armature and a portion of the shaft to melt and define a weld joint. The weld joint is permitted to cool thereby joining the shaft to the armature.

12 Claims, 1 Drawing Sheet

6,079,609

METHOD OF JOINING A MEMBER OF SOFT MAGNETIC MATERIAL TO A MEMBER OF HARDENED MATERIAL USING A FRICTION WELD

This Patent Application claims priority to U.S. Provisional Patent Application Ser. No. 60/067,984, filed on Dec. 9, 1997, the contents of which is hereby incorporated by reference in its entirety herein.

FIELD OF THE INVENTION

This invention relates to joining a member of soft magnetic material to a member of hardened material and, more particularly, to joining an annealed magnetic armature of an electromagnetic actuator with a hardened shaft using a friction or inertia welding technique.

BACKGROUND OF THE INVENTION

In an electromagnetic device, such as an electromagnetic actuator of an electronic valve timing system for a motor vehicle, it is often necessary to join a "soft" magnetic material and a hardened, non-magnetic or magnetic material. Typically, the soft magnetic material is in the form of an armature and is annealed to remove most internal stresses and any carbon which may be within the material. The annealing process accounts for consistent magnetic and mechanical performance characteristics of the magnetic circuit components. In an actuator, the hardened material is in the form of a shaft.

One approach to joining the shaft to the armature is to use a brazing technique. However, this process requires high temperature which may destroy the magnetic properties of the armature. Further, the cool down rate may affect the hardness of the shaft and/or the magnetic properties of the armature.

Accordingly, a there is a need to join a soft magnetic material to a hardened material so as to maintain the hardness of the shaft and the magnetic properties of the armature.

SUMMARY OF THE INVENTION

An object of the present invention is to fulfill the need referred to above. In accordance with the principles of the present invention, this objective is obtained by providing a method of joining an armature of an electromagnetic actuator to a shaft. The method includes holding the armature stationary while spinning the shaft. The spinning shaft is then pressing against the stationary armature such that friction between the shaft and the armature causes a portion of the armature and a portion of the shaft to melt and define a weld joint. The weld joint is permitted to cool thereby joining the shaft to the armature.

In accordance with another aspect of the invention, an armature assembly for an electromagnetic actuator is provided. The armature assembly includes an armature composed of a magnetic material, a shaft, and a weld connection between a portion of the shaft and a portion of the armature joining the shaft to the armature. The weld connection includes material of both the armature and the shaft.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

DETAILED DESCRIPTION OF THE INVENTION

Figure 1:
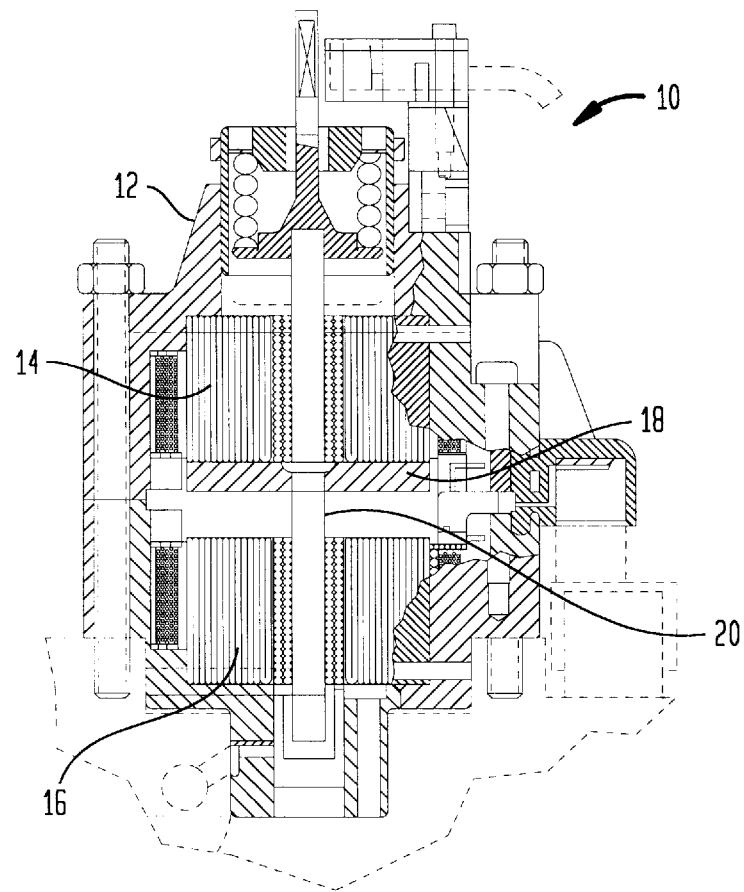
FIG. 1 is a sectional view of an electromagnetic actuator having an magnetic armature and a shaft joined by a friction welding method provided in accordance with the principles of the present invention.

Referring to FIG. 1, an electromagnetic actuator is shown, generally indicated 10, having an armature-shaft connection provided in accordance with the principles of the present invention. The electromagnetic actuator 10 includes a housing structure 12 containing a first electromagnet 14 and a second electromagnet 16, which is disposed generally in opposing relation to the first electromagnet 14. An armature 18 is arranged for movement between the electromagnets 14 and 16. The armature is carried by a shaft 20. The shaft 20 is coupled to a stem of a cylinder valve (not shown) in the conventional manner.

Figure 2:
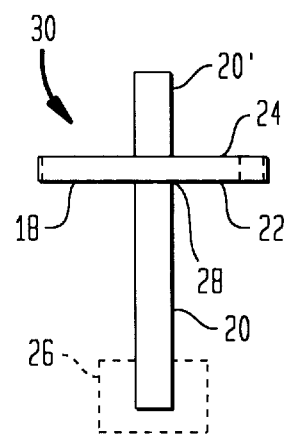
FIG. 2 is an enlarged view, partially in section, of armature assembly wherein a pair of shafts are coupled to an armature via a friction welding operation of the invention.
Figure 3:
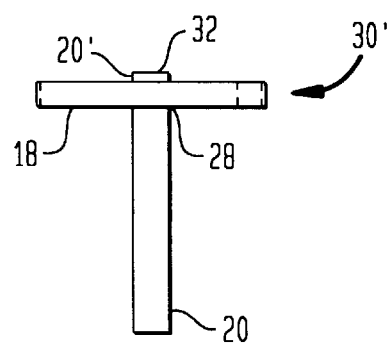
FIG. 3 is an enlarged view of the armature assembly of FIG. 2, shown after a shaft machining operation.

In accordance with the principles of the present invention and with reference to FIGS. 2 and 3, the armature 18 is in the form of a plate having opposing first and second generally planar surfaces 22, and 24, respectively. The armature 18 is composed of a soft magnetic material such as, for example, silicon iron, cobalt iron and nickel iron. Other soft magnetic material may also be employed. The armature 18 is soft since it has been annealed to provide optimum magnetic properties.

The generally cylindrical shaft 20 is preferably composed of hardened material, such as case hardened or tempered steel having a hardness generally greater than 52 HRC. In the illustrated embodiment, the material of the shaft is 8620 steel. Other materials, such as 300 series stainless steel or the like may also be employed for the shaft 20. Thus, the shaft has a hardness substantially greater than the hardness of the armature 18. In the embodiment, shaft 20 is coupled to surface 22 of the armature 18, and a second shaft 20' is coupled to surface 24 of the armature 18 in accordance with a friction welding operation as explained below.

The method of joining the shafts 20 and 20' to the armature 18 by friction welding will be appreciated with reference to FIG. 2. The method of friction welding is a well known process that involves holding one of the components stationary while the other component is spun rapidly. In the illustrated embodiment, the armature 18 is held stationary by appropriate tooling and the shafts 20 and 20' are spun at about 4000–6000 rpm. Of course, the armature 18 may be spun while holding the shaft stationary.

The method of the invention will be described below with reference to welding shaft 20 to surface 22 of the armature 18. It can be appreciated that shaft 20' is attached to surface 24 of the armature 18 by the same method concurrently with welding shaft 20 or at another time.

To cause the shaft 20 to spin, the shaft 20 is coupled to a flywheel 26 of known mass and velocity. After a certain period of time, the drive of the flywheel 26 is disengaged and kinetic energy maintains rotation of the shaft 20'. The shaft 20, while spinning, is then pressed against planar surface 22 of the armature at the appropriate location. The friction between the two components creates enough heat to melt a portion of the material of each component and slows the flywheel, eventually stopping the motion of the flywheel. The pressure applied to the shaft 20 is sufficient to create welding forces that melt material to form an extremely tight weld joint 28. The armature 18 and the shaft are held stationary while cooling to form an armature assembly, shown generally indicated at 30 in FIG. 2. In the illustrated embodiment, the armature assembly 30 includes shafts 20 and 20'. It can be appreciated that shaft 20' may be omitted for use in certain types of electromagnetic actuators.

In the illustrated embodiment, machining operations may then be performed to meet tolerances required by the electromagnetic actuator 10. Thus, in the illustrated embodiment of FIG. 3, surfaces 22 and 24 of the armature 18 are ground to maintain parallelism. In addition, a majority of shaft 20' is removed so as to define a hardened stop surface 32 for the armature assembly 30'. For certain applications shaft 20' need not be removed.

With the friction weld method of the invention, the shaft can be ground and hardened before the welding process since the weld creates little to no warpage of the shaft. Thus, machining of the shaft after the welding operation is generally not necessary.

Since localized heating of the shaft 20 and armature 18 occurs by the friction welding process of the invention, after creating the weld joint 28, the magnetic properties of the armature 18 and the hardness of shaft 20 remain generally unaffected.

It has thus been seen that the objects of this invention have been fully and effectively accomplished. It will be realized, however, that the foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A method of joining a member of annealed magnetic material to a hardened steel shaft member, the method comprising:

holding one of the member of magnetic material and the hardened shaft member stationary while spinning the other member;

pressing the spinning member against the stationary member such that friction between the stationary member and the spinning member causes a portion of the spinning member and a portion of the stationary member to melt and define a weld joint; and permitting said weld joint to cool thereby joining the hardened steel shaft member to the member of magnetic material without substantially affecting the hardness of said shaft member and magnetic properties of said member of magnetic material.

2. The method according to claim 1, wherein said member of magnetic material is held stationary and said hardened member is spun.

3. The method according to claim 2, wherein said hardened member is initially spun by a flywheel, drive to the flywheel being disengaged and said hardened member maintains spinning due to kinetic energy thereof until friction causes said hardened member to stop spinning.

4. The method according to claim 1, wherein said magnetic material includes one of silicon iron, cobalt iron or nickel iron.

5. The method according to claim 1, wherein said member of magnetic material is in the form of a plate having opposing surfaces, the method further including machining said planar surfaces so as to be substantially parallel.

6. A method of joining a magnetic armature member of an electromagnetic actuator to a hardened steel shaft member, the method comprising:

holding one of the armature member and the shaft member stationary while spinning the other of the armature member and shaft member;

pressing the spinning member against the stationary member such that friction between the stationary member and the spinning member causes a portion of the spinning member and a portion of the stationary member to melt and define a weld joint; and permitting said weld joint to cool thereby joining the shaft member to the armature member without substantially affecting the hardness of said shaft member and magnetic properties of said armature member.

7. The method according to claim 6, wherein said armature member is held stationary and said shaft member is spun.

8. The method according to claim 7, wherein said shaft member is initially spun by a flywheel, drive to the flywheel being disengaged and said shaft member continues spinning due to kinetic energy thereof until friction causes said shaft member to stop spinning.

9. The method according to claim 6, wherein said armature member includes one of silicon iron, cobalt iron or nickel iron.

10. The method according to claim 6, wherein said armature member is in the form of a plate having opposing surfaces, said weld joint coupling an end of said shaft member to one of said planar surfaces, the method further including machining said planar surfaces so as to be substantially parallel.

11. The method according to claim 6, further including:

providing a second shaft;

holding said armature stationary while spinning the second shaft;

pressing the second shaft against the other planar surface of the armature member such that friction between the second shaft and the armature member causes a portion of the second shaft and a portion of the armature member to melt and define a second weld joint; and permitting said second weld joint to cool thereby joining the second shaft to the armature member.

12. The method according to claim 11, further including machining said second shaft to define a stop surface.

* * * * *